United States Patent

Rydbeck et al.

[11] Patent Number: 6,108,562
[45] Date of Patent: Aug. 22, 2000

[54] TRAVEL CONVERTER FOR A MOBILE TELEPHONE

[75] Inventors: Nils Rutger Carl Rydbeck, Cary, N.C.; Michael Kornby, Lund; Tord Martin Wingren, Malmo, both of Sweden

[73] Assignee: Telefonaktiebolaget LM Ericsson (publ), Stockholm, Sweden

[21] Appl. No.: 08/911,251

[22] Filed: Aug. 15, 1997

[51] Int. Cl.[7] .............................. H04Q 7/00; H04Q 7/20
[52] U.S. Cl. .................... 455/552; 455/551; 455/553; 455/575; 455/417; 375/220; 375/222
[58] Field of Search .................. 455/552, 553, 455/95, 551, 558, 426, 550, 575, 414, 417; 375/220, 222

[56] References Cited

U.S. PATENT DOCUMENTS

| | | | |
|---|---|---|---|
| 4,972,456 | 11/1990 | Kaczmarek et al. | 379/59 |
| 5,170,494 | 12/1992 | Levanto | 455/90 |
| 5,228,074 | 7/1993 | Mizikovsky | 379/59 |
| 5,396,653 | 3/1995 | Kivari et al. | 455/88 |
| 5,404,579 | 4/1995 | Obayashi et al. | 455/74 |
| 5,463,674 | 10/1995 | Gillig et al. . | |
| 5,490,284 | 2/1996 | Itoh et al. . | |
| 5,533,029 | 7/1996 | Gardner | 370/94 |
| 5,535,430 | 7/1996 | Aoki et al. | 455/553 |
| 5,706,278 | 1/1998 | Robillard et al. | 370/222 |
| 5,761,052 | 6/1998 | Wheller-King et al. | 361/803 |
| 5,778,071 | 7/1998 | Caputo et al. | 375/220 |
| 5,845,215 | 12/1998 | Henry et al. | 455/553 |
| 5,884,168 | 3/1999 | Kolev et al. | 455/552 |
| 5,884,189 | 3/1999 | Yamazaki et al. | 455/552 |
| 5,946,634 | 8/1999 | Korpela | 455/552 |

FOREIGN PATENT DOCUMENTS

| | | |
|---|---|---|
| 0297616 | 1/1988 | European Pat. Off. ......... H04Q 7/04 |
| 0 521 609 | 5/1992 | European Pat. Off. . |
| 0 682 458 | 5/1995 | European Pat. Off. . |
| 5038984 | 2/1993 | Japan . |
| 2 260 467A | 4/1993 | United Kingdom . |
| 2 289 555 | 5/1995 | United Kingdom . |
| WO 89/00370 | 1/1989 | WIPO . |
| WO 95/07595 | 3/1995 | WIPO . |
| WO 95/23485 | 8/1995 | WIPO . |

OTHER PUBLICATIONS

English language abstract of DE 433 0436.
English language abstracts (Basic and Equivalent) of EP 297 616.
European Patent Office, Standard Search Report, Apr. 14, 1998, File No. RS 100048 US.

*Primary Examiner*—Lee Nguyen
*Assistant Examiner*—Simon D. Nguyen
*Attorney, Agent, or Firm*—Jenkens & Gilchrist, P.C.

[57] ABSTRACT

A method and apparatus for effectuating communication between a mobile telephone and at least one communication network not supported by the mobile telephone. A converter interfaces to a mobile telephone to effectuate communication between the mobile telephone and the communication network.

The converter includes a controller for controlling operation of the converter and further for selecting a communication network for communicating with the mobile telephone. Communication protocol functionality within the mobile computer effectuates communication between the mobile telephone and the selected communication network and an interface provides for communication between the mobile telephone and the communication network.

19 Claims, 5 Drawing Sheets

TRAVEL CONVERTER FOR A MOBILE TELEPHONE

BACKGROUND OF THE INVENTION

1. Technical Field of the Invention

The present invention pertains in general to a mobile telephone supporting a plurality of communication network protocols, and more particularly, to a mobile telephone converter for selectively equipping the mobile telephone to communicate using one or more communication network protocols.

2. Description of Related Art

The wireless communications industry is experiencing a proliferation of new mobile communication networks and associated protocols. Currently there exist a variety of analog and digital networks using various communication techniques such as Time Division Multiple Access (TDMA) and Code Division Multiple Access (CDMA). Such systems include the Advanced Mobile Phone Service (AMPS), the Digital Advanced Mobile Phone Service (DAMPS), and the Global System for Mobile communication (GSM) among others. Communication networks also operate on a variety of frequency bands. Furthermore, additional communication networks and protocols for mobile communication continue to be introduced such a Personal Communication System (PCS), and various satellite systems such as Asia Cellular Satellite system (ACeS) and ICO Global Communications satellite system.

At the same time, mobile telephone usage is expanding dramatically and the trend is expected to continue into the foreseeable future. Mobile telephones are increasingly used when traveling as more and more subscribers take their mobile telephones with them when they travel outside of their service areas. Mobile telephones becomes useless, however, when subscribers travel into areas where the available communication network protocols are incompatible with the protocol supported by their mobile telephone.

To address this problem, manufactures of mobile telephones offer mobile telephones which incorporate functionality allowing communication using more than one communication network protocol. The additional functionality, however, results in a mobile telephone which is larger, heavier, and more expensive then a single or dual protocol mobile telephone. Such an approach also requires that the manufacturer and user anticipate which protocols need to be included and no provision is available for adding additional protocols as the subscriber travels into unanticipated areas or as new communication network protocols are introduced. Furthermore, a subscriber may require the added functionality only occasionally and may desire to carry a single or dual protocol mobile telephone and add additional protocol functionality only when traveling.

It would be advantageous therefore, to devise an apparatus and method allowing a mobile telephone to be equipped such that the mobile telephone can be selectively outfitted to operate using one or more communication network protocols.

SUMMARY OF THE INVENTION

The present invention comprises a mobile telephone converter. The converter interfaces to a mobile telephone for effectuating communication between the mobile telephone and a communication network not supported by the mobile telephone. The converter includes a controller for controlling operation of the converter and further for selecting a communication network for communicating with the mobile telephone. Communication protocol functionality within the mobile converter effectuates communication between the mobile telephone and the selected communication network and an interface provides for communication between the mobile telephone and the mobile telephone converter.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figure 1:
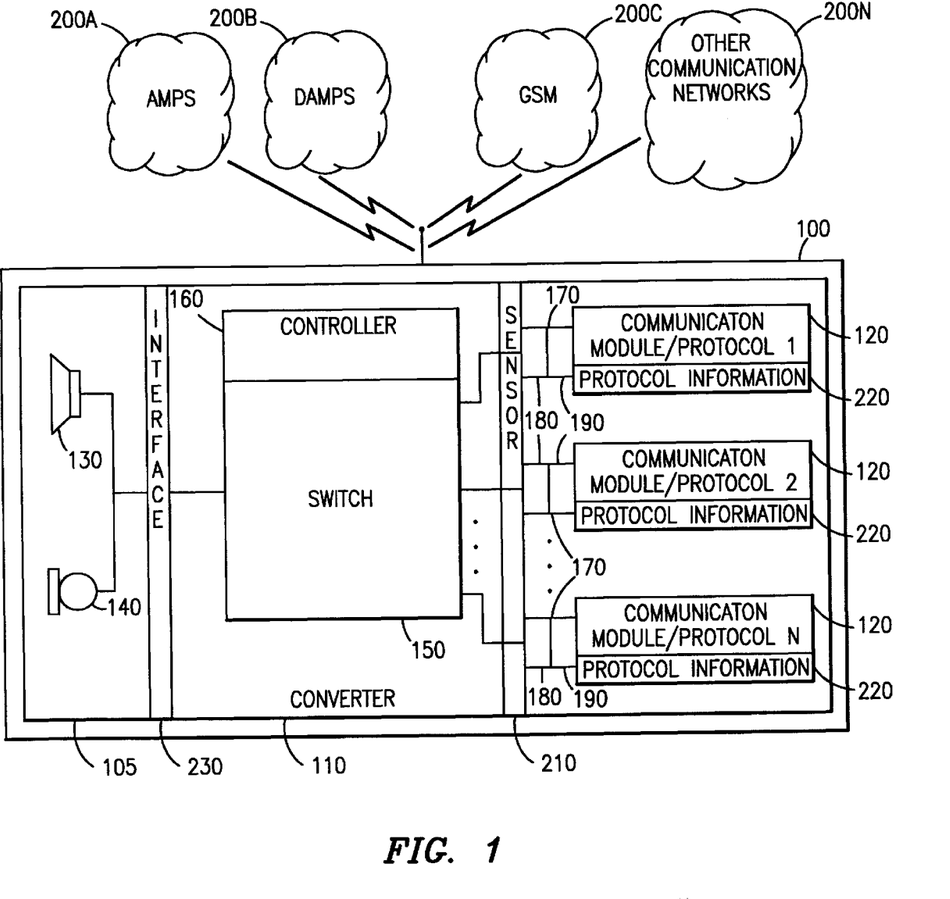
FIG. 1 is a functional block diagram of a mobile telephone having a converter in accordance with a first embodiment of the present invention.

Referring now to FIG. 1, there is illustrated a functional block diagram of a first embodiment of the present invention. A mobile telephone 100 comprises a man machine interface 105, a converter 110, and at least one communication module 120. The man machine interface 105 includes at least an earphone 130 and a microphone 140 which are selectively connected by a controller 160 via a switch 150 and an interface 230 to one of the communication modules 120. The communication modules 120 each contain functionality for effectuating communication between the mobile telephone 100 and a respective one of the plurality of communication networks 200 using protocol of the particular communication network 200. Any communication network can be supported including, but not limited to, an Advanced Mobile Phone Service (AMPS) network 200A, a Digital Advanced Mobile Phone Service (DAMPS) network 200B, a Global System for Mobile communications (GSM) network 200C, or other network 200N. The other networks 200N include various Personal Communication Systems (PCS) and various satellite systems such as Asia Cellular Satellite system (ACeS) and ICO Global Communications satellite system.

The communication modules 120 are electrically and physically connected to the converter 110 via a plurality of connectors 170. The plurality of connectors 170 include a first end 180 attached to the converter 110 and a second end 190 attached to the communication modules 120. The connectors 170 can be of any type and may include, but are not limited to, a slot and edge connector combination, a ribbon cable, or a Personal Computer Memory Card International Association (PCMCIA) connector. Functionality which is common to different network protocols is located within the converter 110 and thus not duplicated while functionality which is unique to a particular network protocol or which is not easily shared between different communication modules 120 is contained within the communication modules 120. The communication modules 120 are easily connected and disconnected from the converter 110 and a subscriber can equip the mobile telephone 100 to operate in various communication networks. Furthermore, the subscriber can purchase additional communication modules 120 as new communication network protocols are introduced. Alternatively, the plurality of connectors 170 can be replaced with a wireless communication link using radio frequencies such as infrared.

In order for the controller 160 to detect the presence of communication module 120 mated to the first end 190 of the connector 180, a sensor 210 detects which connectors 180 have communication modules 120 attached to them and communicates their presence to the controller 160. The sensing mechanism can be any type and may include, but is not limited to, a mechanical pin which is physically depressed by the attachment of the communication module 120 to the converter 110 or an electrical signal which the communication module 120 generates in response to connection to the converter 110. In the event that the plurality of connectors 170 is replaced by a wireless radio frequency communication link such as an infrared communication link, the sensor 210 monitors for a predefined radio frequency to detect the presence of the communication modules 120.

To identify the communication protocol supported by the detected communication modules 120 each communication module 120 includes a memory 220 containing information identifying the associated communication protocol supported by the individual communication module 120. The controller 160 reads the memory 220 to obtain the protocol information.

Once the controller 160 has knowledge of which communication protocols are supported by the mobile telephone 100 based on which communication modules 120 are attached to the converter 110, the controller 160 determines which communication networks 200 are available in the current location of the mobile telephone 100. When communication is to be established with the mobile telephone 100, the controller 160 selects one of the communication networks 200 and connects the man machine interface 105 to the respective communication module 120 supporting the protocol of the selected communication network 200 via the interface 230 and the switch 120. The interface 230 can be a wired connection such as a wire, cable or electrical trace, or the interface 230 can be a wireless connection such as an infrared or radio frequency communication link. Alternatively, the interface 230 can be a fiber optic cable.

Figure 2:
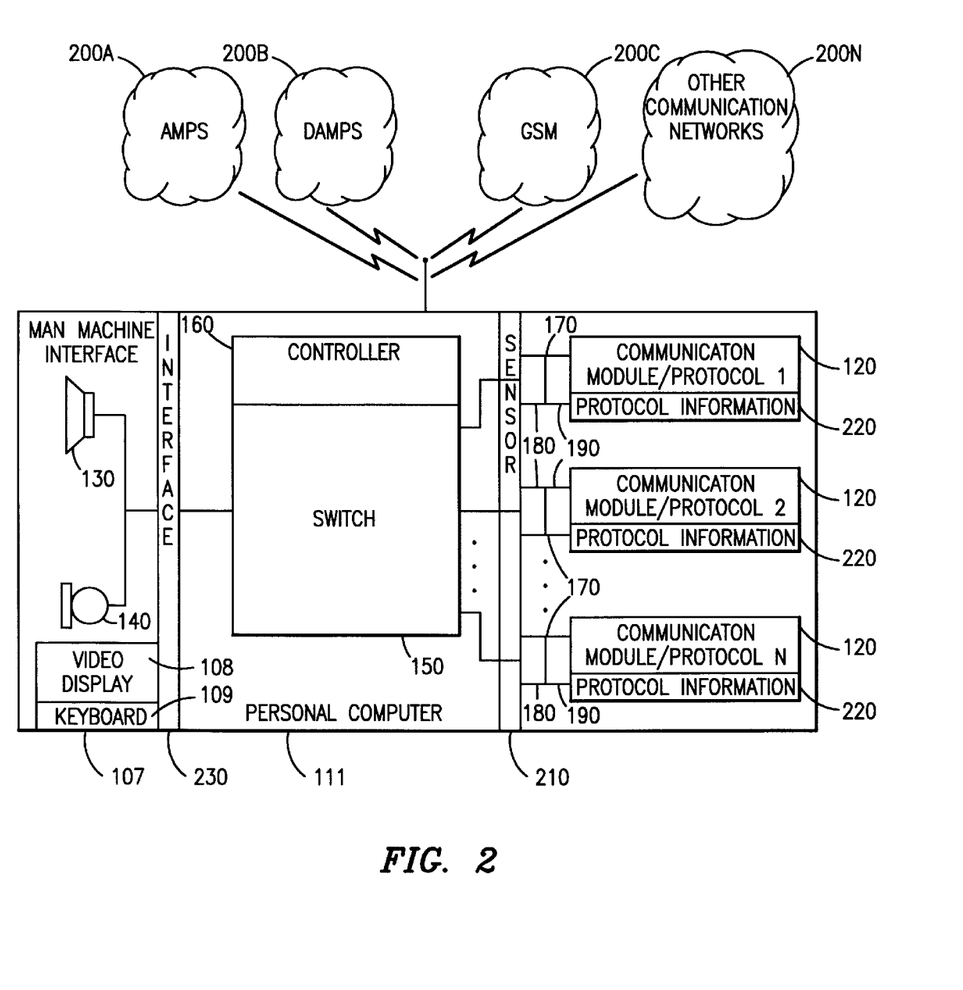
FIG. 2 is a functional block diagram of second embodiment of the present invention wherein the mobile telephone and converter functionality is incorporated into a personal computer.

Referring additionally now to FIG. 2, there is illustrated a second embodiment of the present invention wherein the mobile telephone and converter functionality described in FIG. 1 is incorporated into a personal computer. The mobile telephone and converter functionality is incorporated into a personal computer 111 which interfaces to a man machine interface 107 and at least one communication module 120. The man machine interface 107 includes an earphone 130, a microphone 140, a video display 108, and a keyboard 109. The personal computer 111 and the man machine interface 107 are selectively connected by a controller 160 via a switch 150, and in the case of the man machine interface 107 an interface 230, to one of the communication modules 120. The communication modules 120 each contain functionality for effectuating communication between the personal computer 111, including the man machine interface 107, and a respective one of the plurality of communication networks 200 using protocol of the particular communication network 200. Any communication network can be supported including, but not limited to, an Advanced Mobile Phone Service (AMPS) network 200A, a Digital Advanced Mobile Phone Service (DAMPS) network 200B, a Global System for Mobile communications (GSM) network 200C, or other network 200N. The other networks 200N include various Personal Communication Systems (PCS) and various satellite systems such as Asia Cellular Satellite system (ACeS) and ICO Global Communications satellite system.

The communication modules 120 are electrically and physically connected to the personal computer 111 via a plurality of connectors 170. The plurality of connectors 170 include a first end 180 attached to the personal computer 111 and a second end 190 attached to the individual communication modules 120. The connectors 170 can be of any type and may include, but are not limited to, a slot and edge connector combination, a ribbon cable, or a Personal Computer Memory Card International Association (PCMCIA) connector. Functionality which is common to different network protocols is located within the personal computer 111 and thus not duplicated while functionality which is unique to a particular network protocol or which is not easily shared between different communication modules 120 is contained within the communication modules 120. The communication modules 120 are easily connected and disconnected from the personal computer 111 and a subscriber can equip the personal computer 111 to communicate with various communication networks. Furthermore, the subscriber can purchase additional communication modules 120 as new communication network protocols are introduced.

In order for the controller 160 to detect the presence of communication module 120 mated to the first end 190 of the connector 180, a sensor 210 detects which connectors 180 have communication modules 120 attached to them and communicates their presence to the controller 160. The sensing mechanism can be any type and may include, but is not limited to, a mechanical pin which is physically depressed by the attachment of the communication module 120 to the personal computer 111 or an electrical signal which the communication module 120 generates in response to connection to the personal computer. To identify the communication protocol supported by the detected communication modules 120 each communication module 120 includes a memory 220 containing information identifying the associated communication protocol supported by the individual communication module 120. The controller 160 reads the memory 220 to obtain the protocol information.

Once the controller 160 has knowledge of which communication protocols are supported based on which communication modules 120 are attached to the personal computer 111, the controller 160 determines which communication networks 200 are available in the current location of the personal computer 111. When communication is to be established with the personal computer 111, the controller 160 selects one of the communication networks 200 and connects the personal computer 111 or the man machine interface 107 to the respective communication module 120 supporting the protocol of the selected communication network 200 via the switch 120, and in the case of the man machine interface 107 further through the interface 230. The interface 230 can be a wired connection such as a wire, cable or electrical trace, or the interface 230 can be a wireless connection such as an infrared or radio frequency communication link. Alternatively, the interface 230 can be a fiber optic cable.

Figure 3:
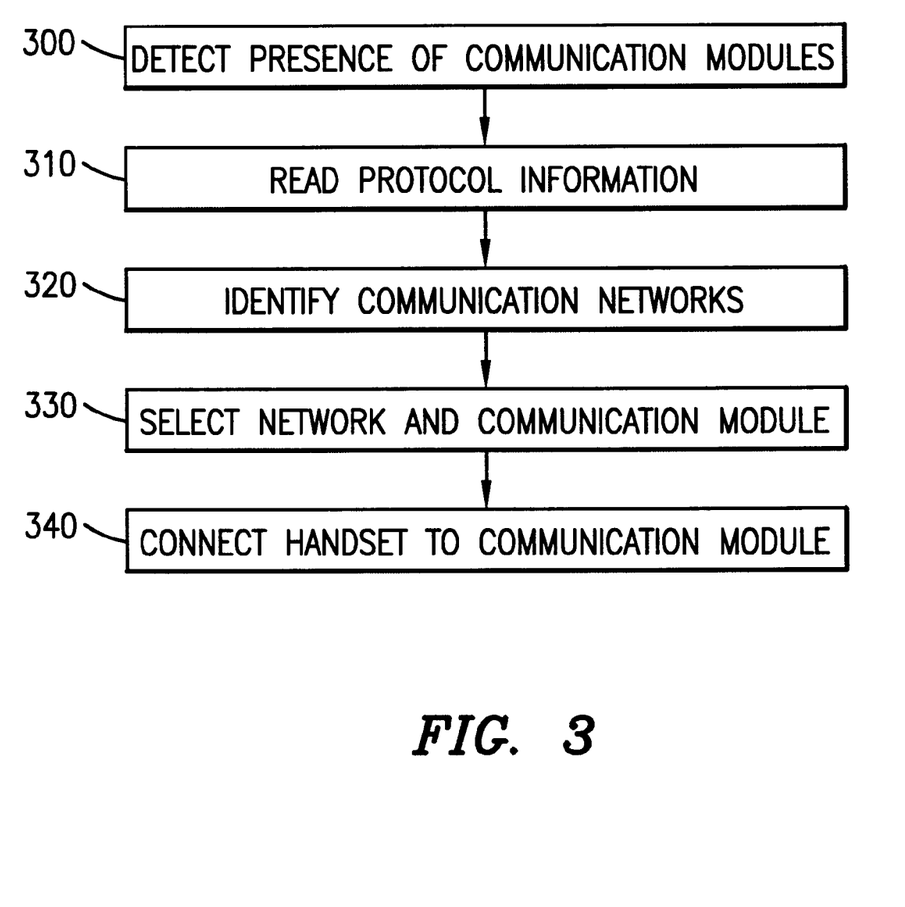
FIG. 3 is a flow diagram of a method for establishing communication between the mobile telephone of the first and second embodiments of the present invention and a selected communication network.

Referring additionally now to FIG. 3, there is illustrated a flow diagram of a method for establishing communication between the mobile telephone of the present invention and a selected communication network. A mobile telephone subscriber equips the mobile telephone by mating one or more communication modules to a converter of the mobile telephone. Each communication module is capable of effectuating communication between the mobile telephone and a communication network using a similar communication protocol. The subscriber selects communication modules to be used in equipping the mobile telephone based on an anticipation of which networks which are to be encountered by the mobile telephone subscriber.

When the mobile telephone is powered up, or alternatively, when the mobile telephone subscriber connects or disconnects one or more communication modules to the converter, a sensor detects the presence or absence of the modules and communicates the information (step 300) to a controller located within the converter. The controller reads a memory located within the communication module (step 310) to obtain information identifying the type of communication protocol supported by the particular communication module. The controller then identifies which, if any, communication networks are available for communication with the mobile telephone in the current location of the mobile telephone (step 320). For each of the communication protocols supported by the mobile telephone as a result of being connected to the associated communication module, the mobile telephone attempts to establish the existence of the network in a manner consistent with the particular protocol.

When communication is to be established with the mobile telephone, the controller selects a network and associated communication module (step 330) based on a any preprogrammed criteria. For example, in the case of an outgoing call, a subscriber can establish a priority for selection of the communication network, or alternatively, the controller can be programed with information pertaining to the cost of using each network and be instructed to select the most economical network. Once the controller has selected the communication network and associated communication module, the controller connects the man machine interface to the selected communication module (step 340) via a switch located within the converter.

Figure 4:
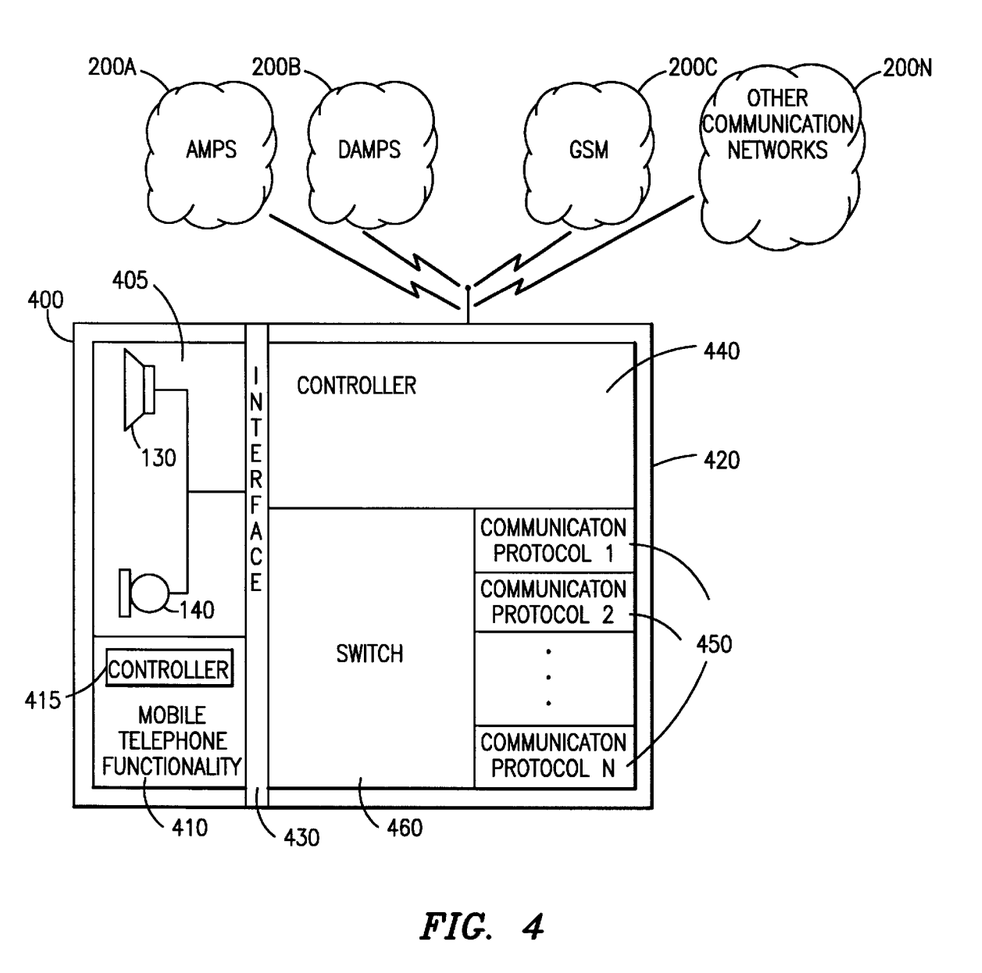
FIG. 4 is a functional block diagram of a mobile telephone and a converter in accordance with a third embodiment of the present invention.

Referring additionally now to FIG. 4, there is illustrated a functional block diagram of a mobile telephone and a converter in accordance with a third embodiment of the present invention. A mobile telephone 400 comprises a man machine interface 405 and mobile telephone functionality 410 including a controller 415. The mobile telephone functionality effectuates communication between the mobile telephone 400 and at least one communication network 200 using protocol of the particular communication network 200. The man machine interface 405 includes at least an earphone 130 and a microphone 140.

In order to communicate with a communication network not supported by the mobile telephone functionality 410, a converter 420 is connected to the mobile telephone 400 via an interface 430. The interface 430 can be effectuated in any manner. For example, the converter 420 can be a module which plugs into the mobile telephone 400. In another example, the converter 420 is fabricated on a semiconductor microchip and interfaces to the mobile telephone 400 via a socket. The converter 420 includes a controller 440 which controls operation of the converter 420, at least one communication protocol functionality 450 for effectuating communication with at least one communication network 200 using protocol of the particular communication network 200, and a switch 460 for connecting the mobile telephone 400 via the interface 430 to the particular communication protocol functionality 450 selected by the controller 440. Any communication network 200 can be supported by the mobile functionality 410 or the communication protocol functionality 450 including, but not limited to, an Advanced Mobile Phone Service (AMPS) network 200A, a Digital Advanced Mobile Phone Service (DAMPS) network 200B, a Global System for Mobile communications (GSM) network 200C, or other network 200N. The other networks 200N include various Personal Communication Systems (PCS) and various satellite systems such as Asia Cellular Satellite system (ACeS) and ICO Global Communications satellite system.

Figure 5:
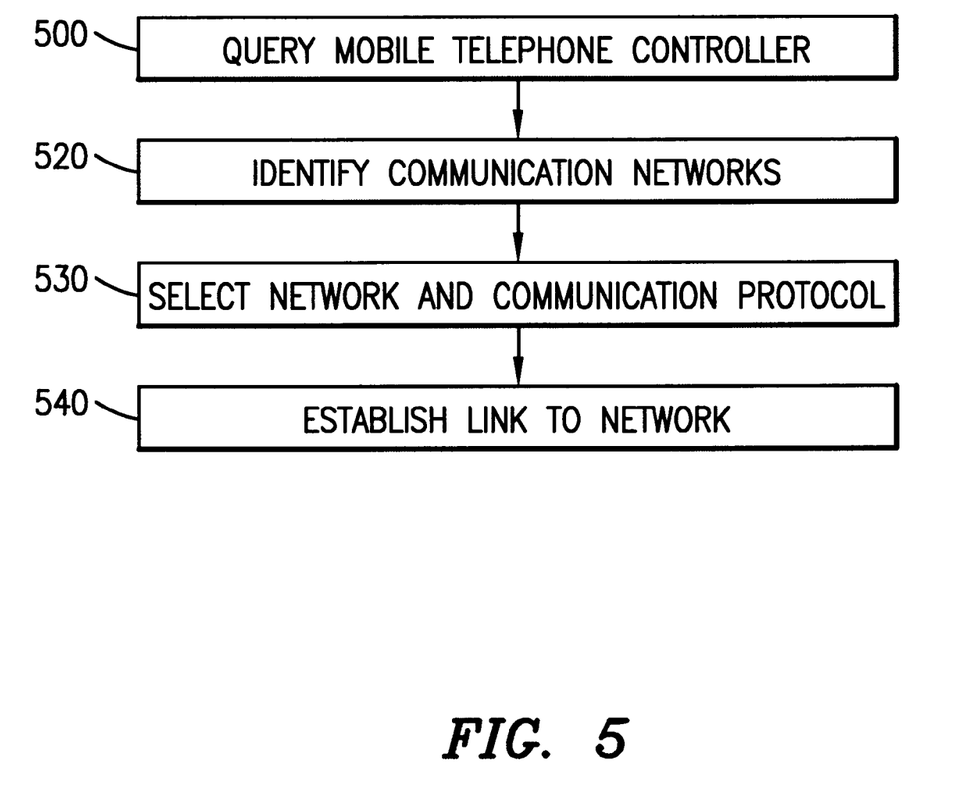
FIG. 5 is a flow diagram of a method for establishing communication between the mobile telephone of the third embodiment of the present invention and a selected communication network.

Referring additionally now to FIG. 5, there is illustrated a flow diagram of a method for establishing communication between the mobile telephone of the third embodiment of the present invention and a selected communication network. When the mobile telephone 400 is powered up, or alternatively, when the mobile telephone subscriber connects the converter 420, the controller 420 queries the mobile telephone controller 415 to determine which communication protocols are supported by the mobile telephone functionality 410 (step 500). The controller 440 identifies which, if any, communication networks 200 supported by the mobile telephone functionality 410 or the communication protocol functionality 450 are available for communication with the mobile telephone 400 in the current location of the mobile telephone 400 (step 520) by attempting to establish the existence of the network in a manner consistent with the particular protocol.

When communication is to be established with the mobile telephone 400, the controller 440 selects a network 200 and associated communication protocol functionality 450 or mobile telephone functionality (step 530) based on a any preprogrammed criteria. For example, in the case of an outgoing call, a mobile telephone subscriber can establish a priority for selection of the communication network, or alternatively, the controller 440 can be programed with information pertaining to the cost of using each network 200 and be instructed to select the most economical network 200. In any event, once the controller 440 has selected the communication network 200 and associated communication protocol functionality 450 or mobile telephone functionality 410, the controller 440 establishes a link between the mobile telephone 400 and the communication network 200 (step 540).

Although a preferred embodiments of the method and apparatus of the present invention have been illustrated in the accompanying Drawings and described in the foregoing Detailed Description, it is understood that the invention is not limited to the embodiments disclosed, but is capable of numerous rearrangements, modifications, and substitutions without departing from the spirit of the invention as set forth and defined by the following claims.

What is claimed is:

1. A mobile telephone for communicating with a plurality of communication networks using a plurality of communication protocols comprising:

a man machine interface having at least a microphone and an earphone;

a plurality of communication modules, each module containing functionality for effectuating communication with an associated communication network using a distinct communication protocol;

a converter for selecting a communication network and a communication module from the plurality of communication modules, the selected communication module having functionality to effectuate communication using the protocol of the selected network, the converter further for effectuating communication between the man machine interface and the communication module;

means for coupling the plurality of communication modules to the converter to permit communication with the converter; and wherein each communication module includes a memory containing protocol information identifying the communication protocol of the communication module, the protocol information being read by the converter.

2. The mobile telephone recited in claim 1, further including a means for interfacing the man machine interface to the converter.

3. The mobile telephone recited in claim 2, wherein the means for interfacing the man machine interface to the converter is a fiber optic cable.

4. The mobile telephone recited in claim 3, wherein the means for interfacing the man machine interface to the converter is a wireless radio frequency communication link.

5. The mobile telephone of claim 4, wherein the wireless radio frequency communication link is an infrared communication link.

6. The mobile telephone of claim 2, wherein said means for interfacing includes a semiconductor chip socket.

7. The mobile telephone recited in claim 1, wherein the plurality of communication protocols include at least one of the following:

a Global System for Mobile communication;

an Advanced Mobile Phone Service; and a Digital Advanced Mobile Phone Service.

8. The mobile telephone recited in claim 1, wherein the mobile telephone is incorporated into a personal computer and the means for coupling includes the plurality of communication modules physically and electrically mated to the mobile telephone via the personal computer using a personal computer memory card interface association connector.

9. The mobile telephone of claim 1, wherein said means for coupling includes means for physically and electrically mating the plurality of communication modules to the converter.

10. The mobile telephone recited in claim 9, wherein the means for physically and electrically mating the plurality of communication modules to the converter comprises a plurality of slots positioned on the converter and an edge connector positioned on each of the communication modules for inserting into one of the plurality of slots.

11. The mobile telephone recited in claim 9, wherein the means for physically and electrically mating the plurality of communication modules to the converter comprises, a ribbon cable.

12. The mobile telephone recited in claim 9, wherein the means for physically and electrically mating the plurality of communication modules to the converter comprises, a personal computer memory card interface association connector.

13. The mobile telephone of claim 1, wherein said means for coupling includes a wireless communication link.

14. The mobile telephone of claim 13, wherein said wireless communication link is an infrared communication link.

15. The mobile telephone of claim 1, wherein the selected network is a satellite network.

16. A mobile telephone for communicating with a plurality of communication networks using a plurality of communication protocols comprising:

a man machine interface having at least a microphone and an earphone:

a plurality of communication modules, each module containing functionality for effectuating communication with an associated communication network using a distinct communication protocol;

a converter for selecting a communication network and a communication module from the plurality of communication modules, the selected communication module having functionality to effectuate communication using the protocol of the selected network, the converter further for effectuating communication between the man machine interface and the communication module;

means for physically and electrically mating the plurality of communication modules to the converter; and said converter including a sensor for detecting the presence of communication modules mated to the converter.

17. The mobile telephone of claim 16, wherein said converter includes a controller for selecting the communication network and further for selecting the communication module, and a switch for electrically connecting the man machine interface to the selected communication module, the switch being controlled by the controller, and wherein said sensor is operable for communicating the presence of the communication modules to the controller.

18. A method for selecting a communication network and a communication module in a mobile telephone comprising the:

detecting the presence of communication modules coupled to the mobile telephone;

reading from respective memories of the detected communication modules protocol information identifying respective communication protocols of the communication modules;

identifying the communication networks currently available; and selecting, according to a defined criteria, the communication network and communication module from the intersection of the set of communication networks identified as being available and the communication modules coupled to the mobile telephone.

19. The method recited in claim 18, further including the step of connecting a man machine interface of the mobile telephone to the communication module.

* * * * *

UNITED STATES PATENT AND TRADEMARK OFFICE
CERTIFICATE OF CORRECTION

PATENT NO.   : 6,108,562
DATED        : August 22, 2000
INVENTOR(S)  : Nils Rutger Rydbeck, et al.

It is certified that error appears in the above-identified patent and that said Letters Patent is hereby corrected as shown below:

<u>Column 7,</u>
Line 19, replace "claim 3" with -- claim 2 --

<u>Column 8,</u>
Line 39, replace "the:" with -- the steps of: --

<u>Column 10,</u>
Line 50, delete "set of"

Signed and Sealed this

Twentieth Day of November, 2001

*Attest:*

NICHOLAS P. GODICI
*Attesting Officer*   Acting Director of the United States Patent and Trademark Office